US010648577B2

(12) United States Patent
Ozeki

(10) Patent No.: US 10,648,577 B2
(45) Date of Patent: May 12, 2020

(54) CONTROL VALVE

(71) Applicant: YAMADA MANUFACTURING CO., LTD., Kiryu-shi, Gunma (JP)

(72) Inventor: Akifumi Ozeki, Kiryu (JP)

(73) Assignee: YAMADA MANUFACTURING CO., LTD., Kiryu-Shi (JP)

(*) Notice: Subject to any disclaimer, the term of this patent is extended or adjusted under 35 U.S.C. 154(b) by 0 days.

(21) Appl. No.: 15/951,654

(22) Filed: Apr. 12, 2018

(65) Prior Publication Data

US 2019/0003602 A1 Jan. 3, 2019

(30) Foreign Application Priority Data

Jun. 28, 2017 (JP) .................................. 2017-126571
Mar. 7, 2018 (JP) .................................. 2018-040759

(51) Int. Cl.
| | |
|---|---|
| *F16K 11/085* | (2006.01) |
| *F16K 31/04* | (2006.01) |
| *F16K 5/18* | (2006.01) |
| *F16K 5/16* | (2006.01) |
| *F01P 3/20* | (2006.01) |

(Continued)

(52) U.S. Cl.
CPC .............. *F16K 11/085* (2013.01); *F01P 3/20* (2013.01); *F01P 7/165* (2013.01); *F16K 5/168* (2013.01); *F16K 5/181* (2013.01); *F16K 5/205* (2013.01); *F16K 11/0712* (2013.01); *F16K 11/087* (2013.01); *F16K 31/04* (2013.01);
(Continued)

(58) Field of Classification Search
CPC ...... F16K 31/041; F16K 31/04; F16K 11/085; F16K 11/0856; F16K 11/087; F16K 5/181; F16K 5/18; F16K 5/201; F16K 5/20; F16K 5/168; F16K 5/205; F01P 3/20; F01P 7/165; F01P 2007/146; F01P 7/14

See application file for complete search history.

(56) References Cited

U.S. PATENT DOCUMENTS 2,929,606 A * 3/1960 Kaiser ................... F16K 5/0694
251/174
4,175,590 A * 11/1979 Grandclement ........ B29C 65/08
137/883
(Continued)

FOREIGN PATENT DOCUMENTS

| EP | 3006794 A1 * | 4/2016 | ....... F16K 31/52466 |
|---|---|---|---|
| GB | 1475647 A * | 6/1977 | ............. F16K 5/201 |
| JP | 2016-114125 | 6/2016 | |

*Primary Examiner* — Reinaldo Sanchez-Medina
*Assistant Examiner* — David Colon-Morales
(74) *Attorney, Agent, or Firm* — Rankin, Hill & Clark LLP

(57) ABSTRACT

A control valve includes a casing that has a port in which an outflow opening is formed, a joint that is joined to an opening end surface of an outflow opening in the port, a rotor that is rotatably accommodated inside the casing, a slide ring that has a slide surface for sliding on an outer circumferential surface of the rotor, a sealing ring that is interposed between an inner circumferential surface of the port and an outer circumferential surface of the slide ring, and a holder that is disposed between the inner circumferential surface of the port and the outer circumferential surface of the slide ring and holds the sealing ring from an outer side in a port axial direction with respect to the sealing ring. The holder is disposed to be separated from at least any of the joint and the port.

5 Claims, 9 Drawing Sheets

(51) Int. Cl.
*F01P 7/16* (2006.01)
*F16K 5/20* (2006.01)
*F16K 11/07* (2006.01)
*F16K 11/087* (2006.01)
*F01P 7/14* (2006.01)
*F16K 5/06* (2006.01)

(52) U.S. Cl.
CPC ...... *F16K 31/041* (2013.01); *F01P 2007/146* (2013.01); *F16K 5/06* (2013.01)

(56) References Cited

U.S. PATENT DOCUMENTS

| | | | | |
|---|---|---|---|---|
| 5,419,532 A | * | 5/1995 | Fan | F16K 5/0673 |
| | | | | 251/315.08 |
| 6,164,248 A | * | 12/2000 | Lehmann | F01P 5/10 |
| | | | | 123/41.1 |
| 6,994,316 B2 | * | 2/2006 | Pervaiz | F16K 5/0478 |
| | | | | 251/160 |
| 7,661,193 B2 | * | 2/2010 | Kishi | B29C 65/0672 |
| | | | | 228/114.5 |
| 9,945,283 B2 | * | 4/2018 | Muizelaar | F01P 7/14 |
| 2003/0111631 A1 | * | 6/2003 | Gosling | F16K 5/0678 |
| | | | | 251/315.01 |
| 2014/0291566 A1 | * | 10/2014 | Yokoyama | F16K 5/0689 |
| | | | | 251/315.01 |
| 2016/0123218 A1 | * | 5/2016 | Lee | F01P 7/165 |
| | | | | 123/41.08 |
| 2016/0160737 A1 | * | 6/2016 | Lee | F01P 7/14 |
| | | | | 123/41.08 |
| 2017/0009894 A1 | * | 1/2017 | Seko | F16K 5/0663 |
| 2017/0122181 A1 | * | 5/2017 | Murakami | F01P 7/165 |
| 2017/0321812 A1 | * | 11/2017 | Jang | F16K 5/0663 |
| 2017/0335750 A1 | * | 11/2017 | Yumisashi | F01P 7/16 |
| 2018/0051815 A1 | * | 2/2018 | Murakami | F16K 11/076 |
| 2018/0066758 A1 | * | 3/2018 | Yumisashi | F01P 7/14 |
| 2018/0335153 A1 | * | 11/2018 | Ozeki | F16K 11/0853 |
| 2018/0347448 A1 | * | 12/2018 | Morota | F16K 11/085 |
| 2019/0154161 A1 | * | 5/2019 | Kazama | F16K 5/0605 |

* cited by examiner

CONTROL VALVE

CROSS-REFERENCE TO RELATED APPLICATION

Priority is claimed on Japanese Patent Application No. 2017-126571, filed Jun. 28, 2017 and Japanese Patent Application No. 2018-040759, filed Mar. 7, 2018, the contents of which is incorporated herein by reference.

BACKGROUND

Field

The present invention relates to a control valve.

Description of Related Art

In the related art, cooling systems for cooling an engine using cooling water are known. In these types of cooling systems, there are cases in which a plurality of heat exchange flow channels through which cooling water circulates between various heat exchangers are provided separately from a radiator flow channel for circulation between a radiator and an engine.

In such cooling systems, a control valve for controlling a flow of the cooling water to each of the flow channels is provided in a bifurcation portion leading to each of the flow channels (the radiator flow channel, the heat exchange flow channel, and the like).

The control valve described above includes a casing that has an outflow port in which an outflow opening for cooling water is formed, and a rotor that is rotatably accommodated inside the casing and has a flow passage through which the cooling water flows. A communication opening, which causes the flow passage and the outflow opening to communicate with each other in accordance with rotation of the rotor, is formed in the rotor.

According to the configuration, when the rotor rotates, the outflow opening and the communication opening switch between communication and isolation. Then, the cooling water which has flowed into the control valve flows out from the control valve through the outflow opening while communicating with the communication opening, during a process of flowing through the flow passage. Accordingly, the cooling water which has flowed into the control valve is distributed to one or a plurality of flow channels in accordance with rotation of the rotor.

In the above-described control valve, a joint for connecting an outflow port (outflow opening) and each of flow channels to each other is joined to the outflow port. A sealing mechanism for sealing an area between the joint and a rotor is provided inside the outflow port. For example, Japanese Unexamined Patent Application, First Publication No. 2016-114125 discloses a configuration of a sealing mechanism including a slide ring which is slidable on an outer circumferential surface of the rotor, a support ring which is externally fitted to the slide ring, and a sealing ring which comes into tight contact with an area between the support ring and the joint.

The above-described joint is joined to the outflow port by performing, for example, vibration welding. In this case, the joint vibrates due to vibration generated at the time of welding.

According to the foregoing technology in the related art, since the slide ring is retained on a side surface of the joint, vibration generated at the time of welding is transmitted to the slide ring via the joint. When an inclination is caused in the slide ring due to vibration transmitted to the slide ring, there is a possibility that sealing properties between the joint and the rotor will become insufficient. As a result, there is a possibility that desired flow rate characteristics will not be achieved.

SUMMARY

The present invention provides a control valve in which sealing properties between a joint and a rotor can be ensured and desired flow rate characteristics can be achieved.

According to a first aspect of the present invention, there is provided a control valve including a casing having an outflow port which is open in a first direction and in which an outflow opening for a fluid is formed, a joint that is joined to an opening end surface of the outflow opening in the outflow port, a rotor that is rotatably accommodated inside the casing and has a communication opening formed to be able to communicate with the outflow opening, a slide ring that has a slide surface for sliding on an outer circumferential surface of the rotor while being accommodated inside the outflow port and communicates the outflow opening and the communication opening in accordance with a rotational position of the rotor, a sealing ring that is interposed between an inner circumferential surface of the outflow port and an outer circumferential surface of the slide ring, and a holder that is disposed between the inner circumferential surface of the outflow port and the outer circumferential surface of the slide ring and holds the sealing ring from an opposite side of the rotor in the first direction with respect to the sealing ring. The holder is disposed to be separated from at least any of the joint and the outflow port.

According to the present aspect, the holder is interposed between the inner circumferential surface of the outflow port and the outer circumferential surface of the slide ring. The holder is disposed to be separated from at least any of the joint and the outflow port. Accordingly, the slide ring can be prevented from being misaligned in a direction intersecting the first direction due to the joint and the outflow port joined to each other. In this case, for example, vibration transmitted to the joint at the time of vibration welding of the joint and the outflow port can be prevented from being transmitted to the slide ring and the slide ring can be assembled at a desired position.

Particularly, in the present aspect, the holder which is disposed to be separated from at least any of the joint and the outflow port holds the sealing ring from the opposite side of the rotor in the first direction in the sealing ring. Therefore, for example, vibration transmitted to the joint at the time of vibration welding of the joint and the outflow port can be prevented from being transmitted to the sealing ring via the holder. Accordingly, movement of the sealing ring can be regulated by the holder, and the sealing ring can be assembled at a desired position. As a result, sealing properties between the joint and the rotor can be ensured and desired flow rate characteristics can be achieved.

According to a second aspect of the present invention, the slide ring may include a small diameter portion having the outer circumferential surface on which the sealing ring slides, and a large diameter portion which is positioned on the rotor side in the first direction with respect to the small diameter portion and is increased in diameter with respect to the small diameter portion. A surface of the large diameter portion facing the rotor in the first direction may configure the slide surface. A surface of the large diameter portion facing the opposite side of the rotor in the first direction may configure a facing surface facing the sealing ring in the first direction. An area of the slide surface may be greater than an area of the facing surface.

According to the present aspect, a fluid pressure inside the casing acts on the facing surface and the slide surface of the slide ring. In this case, the pressure of a fluid inside the casing directly acts on the facing surface. On the other hand, the pressure of the fluid inside the casing does not directly act on the slide surface. Specifically, the pressure of the fluid acts while the pressure is reduced when the fluid flows from an outer circumferential edge toward an inner circumferential edge in a very small gap between the slide surface and the rotor. In this case, the pressure of the fluid is gradually reduced toward the inner circumferential edge and tends to push the slide ring outward in the first direction. Therefore, if a pressing force in the first direction due to the fluid pressure acting on a sealing tube member through the facing surface is a force equal to or greater than a rising force from the rotor acting on the slide ring when the fluid leaks out from the very small gap between the slide surface and the rotor, the slide surface of the slide ring can be maintained in contact with the rotor.

In the present aspect, the area of the slide surface of the slide ring is greater than the area of the facing surface. Accordingly, even if the fluid pressure inside the casing increases, the slide ring can be prevented from pressing the rotor with an excessive force. Therefore, a drive unit which rotationally drives the rotor can be prevented from increasing in size and having a high output, and early abrasion of the slide ring and the like can be prevented.

According to a third aspect of the present invention, the holder may be disposed to be movable in the first direction with respect to the casing and the joint.

According to the present aspect, compared to a configuration in which the holder is fixed to the outflow port or the joint through press-fitting or the like, dimensional management becomes easier and assembling properties of the holder can be improved.

According to a fourth aspect of the present invention, the holder may include a holder tube portion which surrounds the periphery of the slide ring, and a holder flange portion which bulges outward from the holder tube portion. The outflow port may have a first regulation portion which comes into contact with the holder flange portion in the first direction and may regulate movement of the holder to the rotor side in the first direction with respect to the casing.

According to the present aspect, since movement of the holder to the rotor side in the first direction with respect to the casing is regulated, the holder is likely to be assembled at a desired position. Therefore, the sealing ring can be prevented from being squashed at the time of assembling the holder.

According to a fifth aspect of the present invention, a biasing member biasing the slide ring toward the rotor may be interposed between the joint and the slide ring. A second regulation portion which protrudes in the first direction from the holder tube portion and regulates movement of the biasing member in a second direction intersecting the first direction may be formed in the holder.

According to the present aspect, the biasing member is prevented from being misaligned, and an area between the slide ring and the rotor can be stably sealed over a long period of time.

According to a sixth aspect of the present invention, the outflow port may include a port joining portion which is positioned in an outer circumferential part, and a sealing wall which is positioned on the inner circumferential side with respect to the port joining portion and has an inner circumferential surface on which the sealing ring slides. The joint may include a joint joining portion which is joined to the port joining portion. A burr accommodation portion which accommodates burrs generated when the port joining portion and the joint joining portion are joined to each other may be formed between the sealing wall, and the port joining portion and the joint joining portion.

According to the present aspect, burrs generated when the outflow port and the joint are joined to each other can be accommodated in the burr accommodation portion. Therefore, burrs can be prevented from being incorporated into the fluid and becoming contamination.

Furthermore, in the present aspect, since scattering of burrs can be regulated by the sealing wall, it is possible to be reduced in size and simplified compared to a case in which a burr regulation wall is provided separately from the sealing wall.

According to the control valve, sealing properties between the joint and the rotor can be ensured and desired flow rate characteristics can be achieved.

DETAILED DESCRIPTION OF THE INVENTION

Hereinafter, an embodiment of the present invention will be described based on the drawings. In the description below, a case in which a cooling system for cooling an engine using cooling water employs a control valve of the present embodiment will be described.

[Cooling System]

Figure 1:
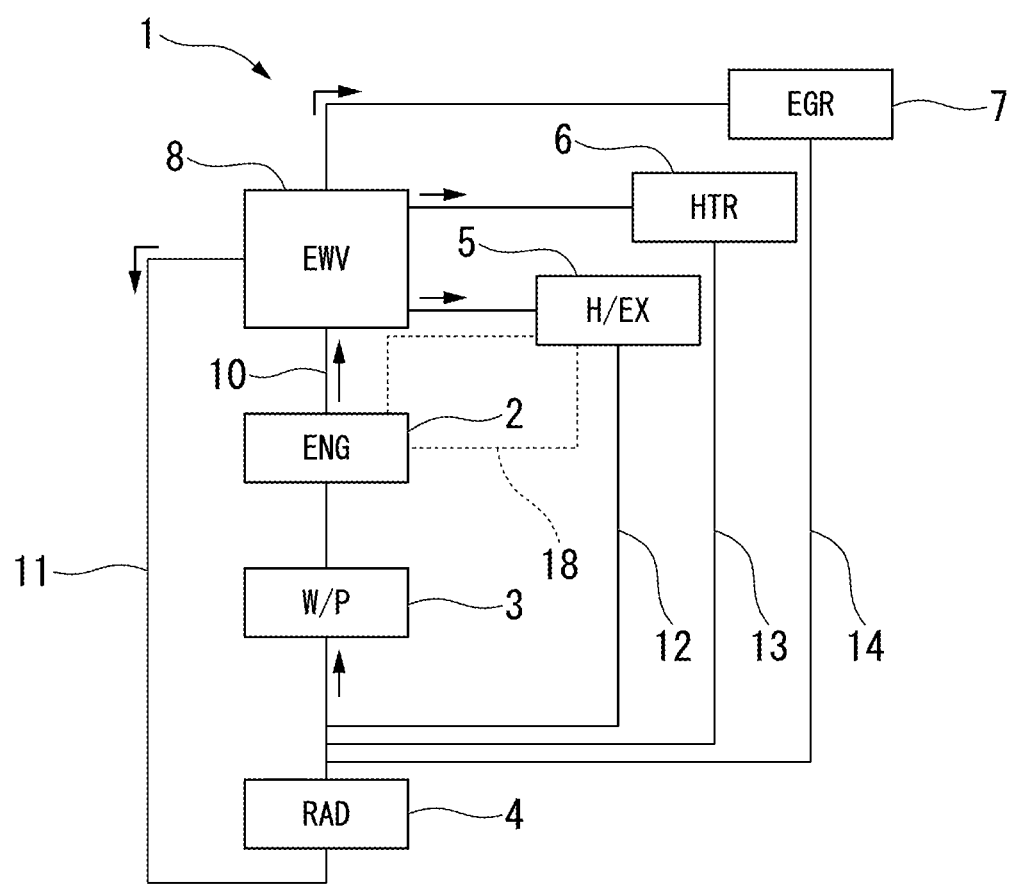
FIG. 1 is a block diagram of a cooling system according to an embodiment.

FIG. 1 is a block diagram of a cooling system 1.

As illustrated in FIG. 1, the cooling system 1 is mounted in a vehicle equipped with at least an engine as a vehicle driving source. In addition to a vehicle having only an engine, the vehicle may be a hybrid vehicle, a plug-in hybrid vehicle, or the like.

The cooling system 1 has a configuration in which an engine 2 (ENG), a water pump 3 (W/P), a radiator 4 (RAD), a heat exchanger 5 (H/EX), a heater core 6 (HTR), an EGR cooler 7 (EGR), and a control valve 8 (EWV) are connected to each other through various flow channels 10 to 14.

The water pump 3, the engine 2, and the control valve 8 are connected in order on the main flow channel 10 from the upstream side to the downstream side. In the main flow channel 10, the cooling water passes through the engine 2 and the control valve 8 in order in accordance with an operation of the water pump 3.

Each of the radiator flow channel 11, the warming-up flow channel 12, the air-conditioning flow channel 13, and the EGR flow channel 14 is connected to the main flow channel 10. The radiator flow channel 11, the warming-up flow channel 12, the air-conditioning flow channel 13, and the EGR flow channel 14 individually connect an upstream part of the water pump 3 and the control valve 8 with each other in the main flow channel 10.

The radiator 4 is connected to the radiator flow channel 11. In the radiator flow channel 11, heat is exchanged between the cooling water and outside air via the radiator 4.

The heat exchanger 5 is connected to the warming-up flow channel 12. Engine oil circulates between the heat exchanger 5 and the engine 2 through an oil flow channel 18. In the warming-up flow channel 12, heat is exchanged between the cooling water and the engine oil via the heat exchanger 5. That is, the heat exchanger 5 functions as an oil warmer for warming the engine oil when a water temperature is higher than an oil temperature. On the other hand, the heat exchanger 5 functions as an oil cooler for cooling the engine oil when the water temperature is lower than the oil temperature.

The heater core 6 is connected to the air-conditioning flow channel 13. For example, the heater core 6 is provided inside a duct (not illustrated) of an air-conditioner. In the air-conditioning flow channel 13, heat is exchanged between the cooling water and air-conditioning air which flows through inside the duct, via the heater core 6.

The EGR cooler 7 is connected to the EGR flow channel 14. In the EGR flow channel 14, heat is exchanged between the cooling water and an EGR gas via the EGR cooler 7.

In the cooling system 1 described above, the cooling water which has passed through the engine 2 via the main flow channel 10 flows into the control valve 8. Thereafter, the cooling water is selectively distributed to the various flow channels 11 to 13 in accordance with an operation of the control valve 8. Accordingly, early warming, high-water temperature (optimum temperature) control, and the like can be realized, and improvement of fuel efficiency of the vehicle is achieved.

<Control Valve>

Figure 2:
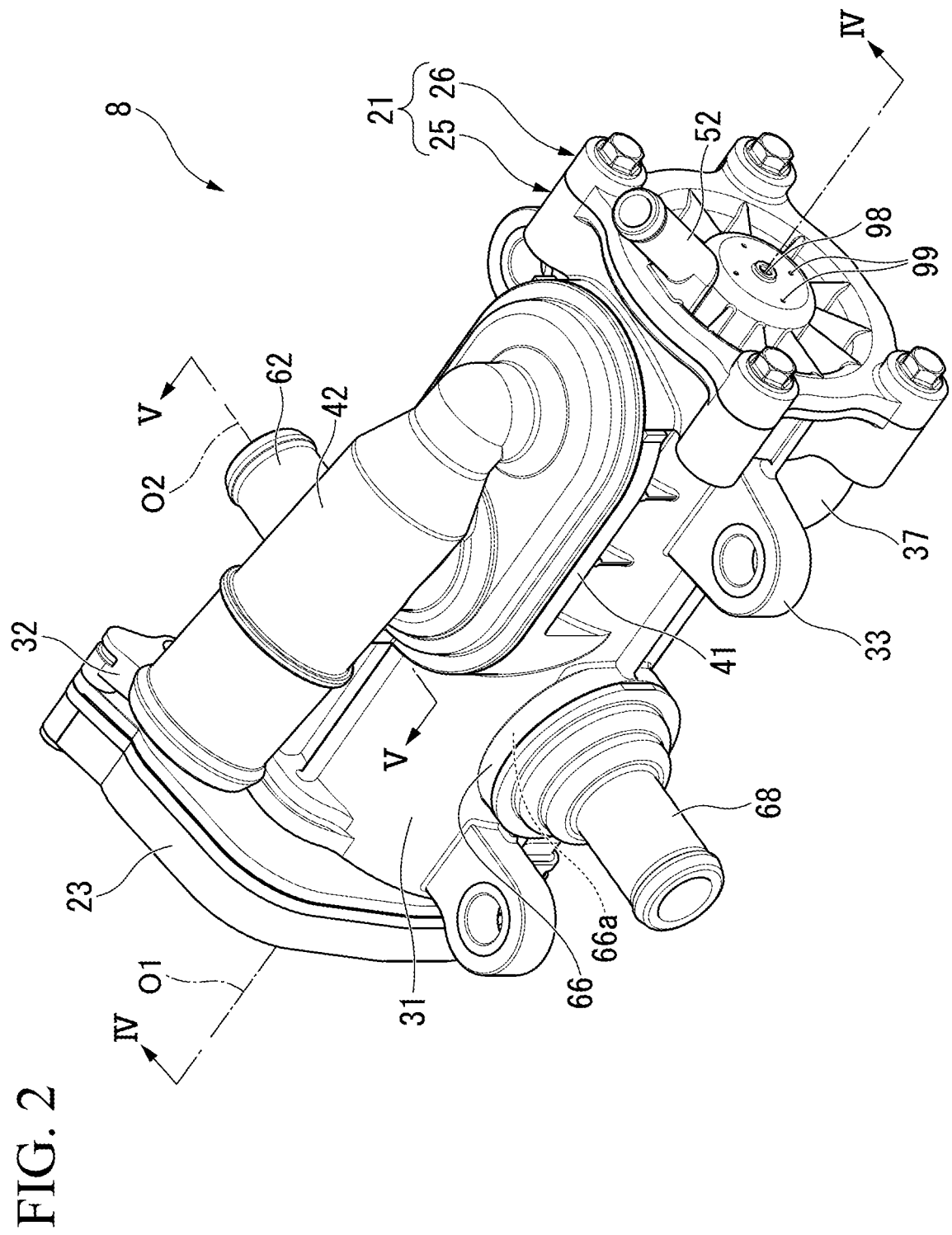
FIG. 2 is a perspective view of a control valve according to the embodiment.
Figure 3:
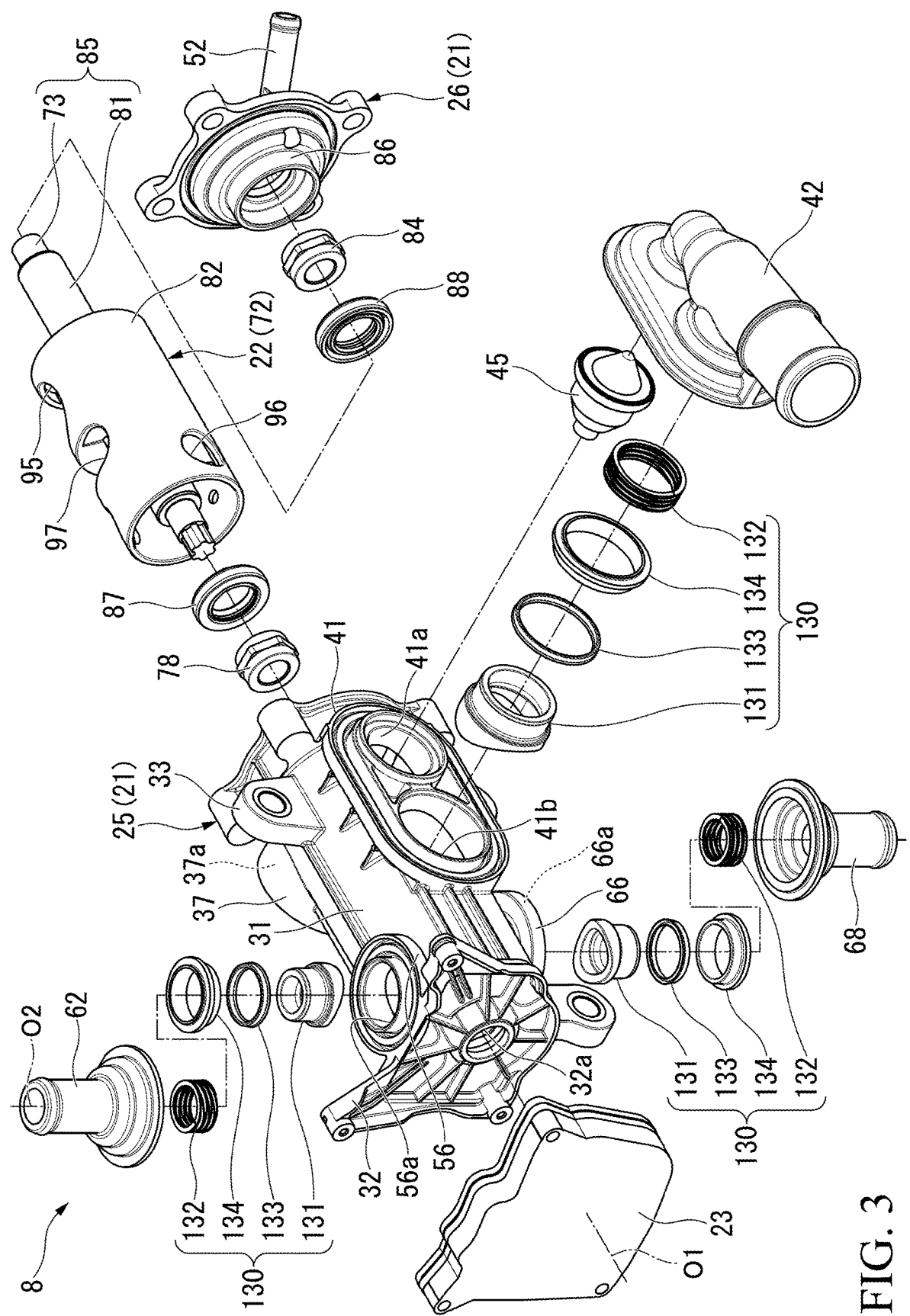
FIG. 3 is an exploded perspective view of the control valve according to the embodiment.

FIG. 2 is a perspective view of the control valve 8. FIG. 3 is an exploded perspective view of the control valve 8.

As illustrated in FIGS. 2 and 3, the control valve 8 includes a casing 21, a rotor 22 (refer to FIG. 3), and a drive unit 23.

(Casing)

The casing 21 has a bottomed tube-shaped casing main body 25 and a lid body 26 which blocks an opening portion of the casing main body 25. In the description below, a direction along an axial line O1 of the casing 21 will be simply referred to as a case axial direction. In the case axial direction, a direction toward a bottom wall portion 32 of the casing main body 25 with respect to a circumferential wall portion 31 of the casing main body 25 will be referred to as a first side. A direction toward the lid body 26 with respect to the circumferential wall portion 31 of the casing main body 25 will be referred to as a second side. Moreover, a direction orthogonal to the axial line O1 will be referred to as a case radial direction. A direction around the axial line O1 will be referred to as a case circumferential direction.

A plurality of attachment pieces 33 are formed in the circumferential wall portion 31 of the casing main body 25. Each of the attachment pieces 33 is provided to protrude outward in the case radial direction from the circumferential wall portion 31. For example, the control valve 8 is fixed inside an engine room via each of the attachment pieces 33. The positions, the number, and the like of the attachment pieces 33 can be suitably changed.

Figure 4:
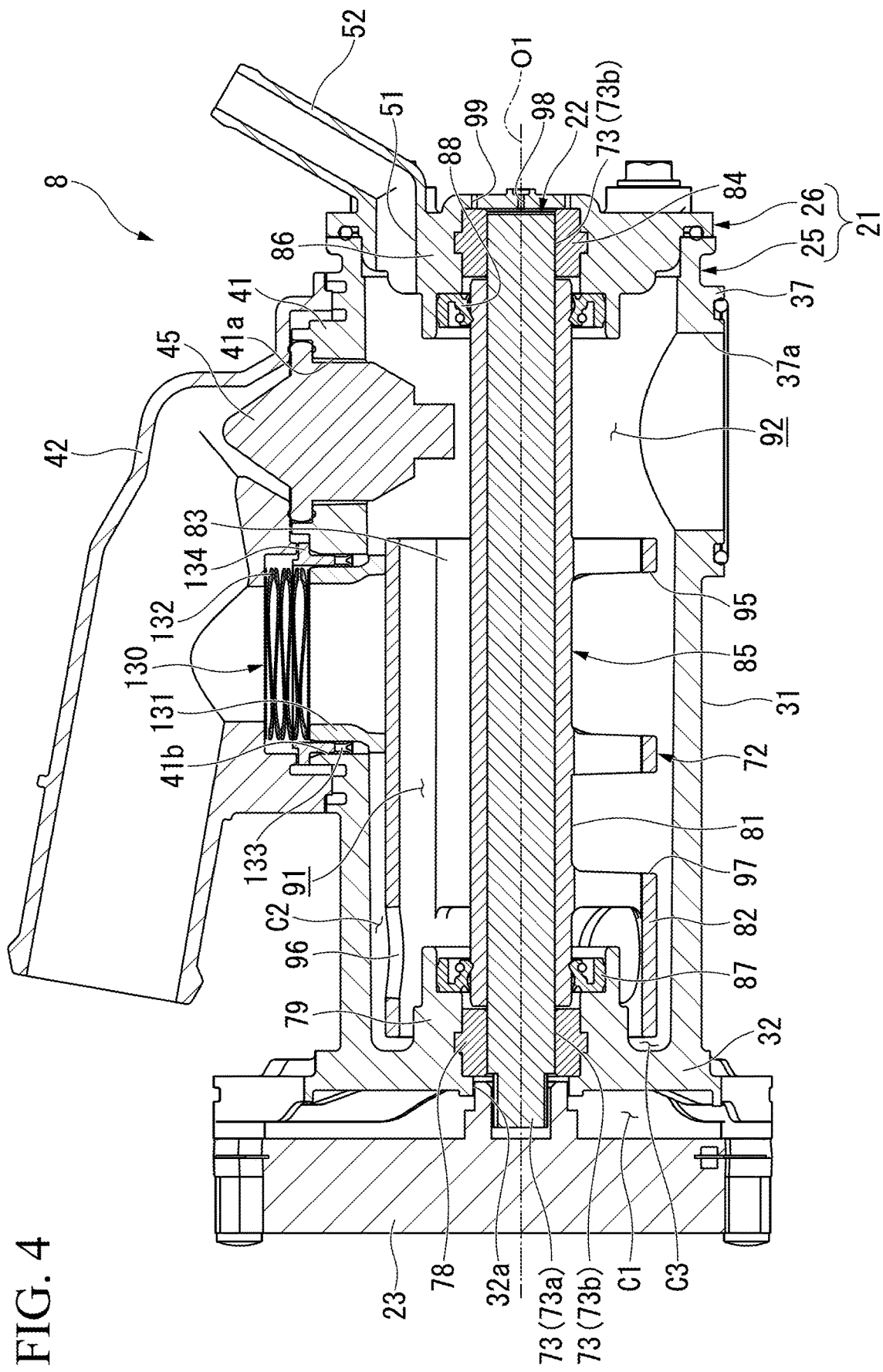
FIG. 4 is a cross-sectional view taken along line IV-IV in FIG. 2.

FIG. 4 is a cross-sectional view taken along line IV-IV in FIG. 2.

As illustrated in FIGS. 3 and 4, an inflow port 37 bulging outward in the case radial direction is formed in a position on the second side in the circumferential wall portion 31. An inflow opening 37a (refer to FIG. 4) penetrating the inflow port 37 in the case radial direction is formed in the inflow port 37. The inflow opening 37a allows the inside and the outside of the casing 21 to communicate with each other. The above-described main flow channel 10 (refer to FIG. 1) is connected to an opening end surface (outer side end surface in the case radial direction) of the inflow port 37.

As illustrated in FIG. 4, in the circumferential wall portion 31, a radiator port 41 bulging outward in the case radial direction is formed at a position facing the inflow port 37 in the case radial direction while having the axial line O1 interposed therebetween. In the radiator port 41, a fail opening 41a and a radiator outflow opening 41b are formed side by side in the case axial direction. The fail opening 41a and the radiator outflow opening 41b individually penetrate the radiator port 41 in the case radial direction. In the present embodiment, the fail opening 41a faces the above-described inflow opening 37a in the case radial direction.

In addition, the radiator outflow opening 41b is positioned on the first side in the case axial direction with respect to the fail opening 41a.

A radiator joint 42 is connected to the opening end surface (outer side end surface in the case radial direction) of the radiator port 41. The radiator joint 42 connects the radiator port 41 and an upstream end portion of the radiator flow channel 11 (refer to FIG. 1) with each other. The radiator joint 42 is welded (for example, by vibration welding) onto the opening end surface of the radiator port 41.

A thermostat 45 is provided in the fail opening 41a. That is, the thermostat 45 faces the above-described inflow opening 37a in the case radial direction. The thermostat 45 opens and closes the fail opening 41a in accordance with the temperature of the cooling water flowing inside the casing 21.

An EGR outflow opening 51 is formed in a position near the radiator port 41 in the case radial direction with respect to the axial line O1 in the lid body 26. The EGR outflow opening 51 penetrates the lid body 26 in the case axial direction. In the present embodiment, the EGR outflow opening 51 intersects (is orthogonal to) an opening direction (case radial direction) of the fail opening 41a. In addition, at least a portion of the EGR outflow opening 51 overlaps the thermostat 45 in a front view seen in the case axial direction.

In the lid body 26, an EGR joint 52 is formed at an opening edge of the EGR outflow opening 51. The EGR joint 52 is formed into a tube shape extending outward in the case radial direction toward the second side in the case axial direction. The EGR joint 52 connects the EGR outflow opening 51 and an upstream end portion of the above-described EGR flow channel 14 (refer to FIG. 1) with each other. In the present embodiment, the EGR joint 52 is formed integrally with the lid body 26. However, the EGR joint 52 may be formed separately from the lid body 26. In addition, the EGR outflow opening 51 and the EGR joint 52 may be provided in the circumferential wall portion 31 or the like.

As illustrated in FIG. 3, in the circumferential wall portion 31, a warming-up port 56 bulging outward in the case radial direction is formed in a position on the first side of the radiator port 41 in the case axial direction. A warming-up outflow opening 56*a* penetrating the warming-up port 56 in the case radial direction is formed in the warming-up port 56. A warming-up joint 62 is connected to the opening end surface of the warming-up port 56. The warming-up joint 62 connects the warming-up port 56 and an upstream end portion of the above-described warming-up flow channel 12 (refer to FIG. 1) with each other. The warming-up joint 62 is welded (for example, by vibration welding) onto the opening end surface of the warming-up port 56.

As illustrated in FIG. 2, in the circumferential wall portion 31, an air-conditioning port 66 is formed between the radiator port 41 and the warming-up port 56 in the case axial direction, that is, at a position misaligned with respect to the warming-up port 56 in the case circumferential direction by approximately 180°. An air-conditioning outflow opening 66*a* penetrating the air-conditioning port 66 in the case radial direction is formed in the air-conditioning port 66. An air-conditioning joint 68 is connected to the opening end surface of the air-conditioning port 66. The air-conditioning joint 68 connects the air-conditioning port 66 and an upstream end portion of the above-described air-conditioning flow channel 13 (refer to FIG. 1) with each other. The air-conditioning joint 68 is welded (for example, by vibration welding) onto the opening end surface of the air-conditioning port 66.

(Drive Unit)

As illustrated in FIG. 2, the drive unit 23 is attached to the bottom wall portion 32 of the casing main body 25. The drive unit 23 is configured to store a motor, a speed reducer, a control board, and the like (not illustrated). As illustrated in FIG. 4, a gap C1 is provided between the drive unit 23 and the bottom wall portion 32 in parts other than a fastening part of the drive unit 23 and the bottom wall portion 32.

(Rotor)

As illustrated in FIGS. 3 and 4, the rotor 22 is accommodated inside the casing 21. The rotor 22 is formed into a cylinder shape disposed coaxially with the axial line O1 of the casing 21. When the rotor 22 rotates around the axial line O1, each of the above-described outflow openings (radiator outflow opening 41*b*, the warming-up outflow opening 56*a*, and the air-conditioning outflow opening 66*a*) is opened and closed.

As illustrated in FIG. 4, the rotor 22 is configured to have an inner shaft portion 73 which is insert-molded onto the inner side of a rotor main body 72.

The inner shaft portion 73 is formed of a material (for example, a metal material) having rigidity higher than the rigidity of the rotor main body 72 (which is, for example, a resin material). The inner shaft portion 73 extends coaxially with the axial line O1. For example, the rotor 22 may be integrally formed of a resin material or the like.

A first side end portion of the inner shaft portion 73 penetrates the bottom wall portion 32 in the case axial direction through a penetration hole (open-to-atmosphere portion) 32*a* formed in the bottom wall portion 32. The first side end portion of the inner shaft portion 73 is rotatably supported by a first bushing (first bearing) 78 provided in the above-described bottom wall portion 32. Specifically, a first shaft accommodation wall 79 is formed in the bottom wall portion 32 toward the second side in the case axial direction. The first shaft accommodation wall 79 surrounds the above-described penetration hole 32*a*. The above-described first bushing 78 is fitted on the inner side of the first shaft accommodation wall 79.

In the inner shaft portion 73, a coupling portion 73*a* is formed at a position on the first side of the first bushing 78 in the case axial direction (part positioned on the outer side of the bottom wall portion 32). The coupling portion 73*a* is formed to have a diameter smaller than parts (large diameter portion 73*b*) other than the coupling portion 73*a* in the inner shaft portion 73, and a spline is formed on an outer circumferential surface thereof. The coupling portion 73*a* is coupled to the above-described drive unit 23 outside the casing 21. Accordingly, power of the drive unit 23 is transmitted to the inner shaft portion 73.

A second side end portion of the inner shaft portion 73 is rotatably supported by a second bushing (second bearing) 84 provided in the above-described lid body 26. Specifically, a second shaft accommodation wall 86 is formed in the lid body 26 toward the first side in the case axial direction. The second shaft accommodation wall 86 surrounds the axial line O1 on the inner side of the above-described EGR outflow opening 51 in the case radial direction. The above-described second bushing 84 is fitted on the inner side of the second shaft accommodation wall 86.

As illustrated in FIG. 4, the rotor main body 72 surrounds the periphery of the above-described inner shaft portion 73. The rotor main body 72 has an outer shaft portion 81 covering the inner shaft portion 73, a valve tube portion 82 enclosing the outer shaft portion 81, and a spoke portion 83 causing the outer shaft portion 81 and the valve tube portion 82 to be coupled to each other.

The outer shaft portion 81 surrounds the periphery of the inner shaft portion 73 throughout the entire circumference in a state in which both of the end portions in the case axial direction in the inner shaft portion 73 are exposed. In the present embodiment, a rotary shaft 85 of the rotor 22 is constituted of the outer shaft portion 81 and the inner shaft portion 73.

Within the above-described first shaft accommodation wall 79, the first sealing ring 87 is provided in a position on the second side in the case axial direction with respect to the first bushing 78. The first sealing ring 87 seals an area between an inner circumferential surface of the first shaft accommodation wall 79 and an outer circumferential surface of the rotary shaft 85 (outer shaft portion 81). Therefore, inside the first shaft accommodation wall 79, a position on the first side of a first lip seal 87 in the case axial direction is open to the atmosphere through the penetration hole 32*a*.

On the other hand, inside the above-described second shaft accommodation wall 86, a second lip seal 88 is provided in a position on the first side in the case axial direction with respect to the second bushing 84. The second lip seal 88 seals an area between the inner circumferential surface of the second shaft accommodation wall 86 and the outer circumferential surface between the rotary shaft 85 (outer shaft portion 81). A penetration hole (open-to-atmosphere portion) 98 penetrating the lid body 26 in the case axial direction is formed in the lid body 26. Specifically, the penetration hole 98 is positioned coaxially with the axial line O1 in the lid body 26. In the lid body 26, an outer penetration hole 99 which is a trace of a pin gate at the time of resin molding is formed at a position on an outer side in the case radial direction with respect to the penetration hole 98. In the present embodiment, a plurality of outer penetration holes 99 are formed while having a clearance in the case circumferential direction around the axial line O1. It is preferable that the inner diameters of the penetration hole 98 and the outer penetration hole 99 described above be smaller than gap C2 and C3 between the casing 21 and the valve tube portion 82 described below. Accordingly, even if contamination enters the inside of the casing 21 through the penetration hole 98 and the outer penetration hole 99, rotation of the rotor 22 can be prevented from being hindered due to the contamination being caught between the casing 21 and the valve tube portion 82.

The number, the shape, the position, and the like of the penetration hole 98 and the outer penetration hole 99 can be suitably changed. Inside the second shaft accommodation wall 86, a space, which is defined to be on the second side of a sealing part between the rotary shaft 85 and the second lip seal 88 in the case axial direction, is open to the atmosphere through the penetration hole 98. Therefore, atmospheric pressure acts on the second side end portion (a position on the second side of the outer shaft portion 81, which is sealed by the second lip seal 88, in the case axial direction in the rotary shaft 85) of the rotary shaft 85 in the case axial direction through the penetration hole 98. That is, the present embodiment is configured to cause no differential pressure in the pressure acting on both of the end portions of the rotary shaft 85. The penetration hole 98 is not limited to being coaxial with the axial line O1 as long as at least a portion thereof is formed at a position facing the inner shaft portion 73 (large diameter portion 73b) in the axial direction in the lid body 26 and communicates with an area defined by the lid body 26, the second bushing 84, and the second side end surface of the large diameter portion 73b.

The valve tube portion 82 is disposed coaxially with the axial line O1. The valve tube portion 82 is disposed in a position on the first side of the inflow opening 37a in the case axial direction inside the casing 21. Specifically, the valve tube portion 82 is disposed at a position away from the fail opening 41a across the radiator outflow opening 41b, the warming-up outflow opening 56a, and the air-conditioning outflow opening 66a in the case axial direction. The inner side of the valve tube portion 82 configures a flow passage 91, and the cooling water which has flowed into the casing 21 through the inflow opening 37a flows through the flow passage 91 in the case axial direction. On the other hand, inside the casing 21, a position on the second side of the valve tube portion 82 in the case axial direction configures a connection flow channel 92 communicating with the flow passage 91. A gap S2 is provided between the outer circumferential surface of the valve tube portion 82 and the inner circumferential surface of the circumferential wall portion 31 in the case radial direction. In addition, a gap S3 is provided between the first side end surface in the case axial direction of the valve tube portion 82 and the second side end surface in the case axial direction of the bottom wall portion 32 in the case axial direction.

In the valve tube portion 82, a radiator communication opening 95 penetrating the valve tube portion 82 in the case radial direction is formed at the same position as the above-described radiator outflow opening 41b in the case axial direction. In a case in which at least a portion of the radiator communication opening 95 overlaps a slide ring 131 inserted into the radiator outflow opening 41b when seen in the case radial direction, the radiator outflow opening 41b and the inside of the flow passage 91 communicate with each other through the radiator communication opening 95.

In the valve tube portion 82, a warming-up communication opening 96 penetrating the valve tube portion 82 in the case radial direction is formed at the same position as the above-described warming-up outflow opening 56a in the case axial direction. In a case in which at least a portion of the warming-up communication opening 96 overlaps the slide ring 131 inserted into the warming-up outflow opening 56a when seen in the case radial direction, the warming-up outflow opening 56a and the inside of the flow passage 91 communicate with each other through the warming-up communication opening 96.

In the valve tube portion 82, an air-conditioning communication opening 97 penetrating the valve tube portion 82 in the case radial direction is formed at the same position as the above-described air-conditioning outflow opening 66a in the case axial direction. In a case in which at least a portion of the air-conditioning communication opening 97 overlaps the slide ring 131 inserted into the air-conditioning outflow opening 66a when seen in the case radial direction, the air-conditioning outflow opening 66a and inside of the flow passage 91 communicate with each other through the air-conditioning communication opening 97.

The rotor 22 causes the inside of the flow passage 91 and each of the outflow openings 41b, 56a, and 66a to switch between communication and isolation in accordance with rotation around the axial line O1. A communication pattern between the outflow opening and the communication opening can be suitably set. The layout of the outflow opening and the communication opening can be switched in accordance with the set communication pattern. The outflow opening and the communication opening corresponding to each other need only be disposed at positions in which at least portions thereof overlap each other in the case axial direction.

Subsequently, a connection part of the warming-up port 56 and the warming-up joint 62 will be described in detail.

Since the connection part of the radiator port 41 and the radiator joint 42, and the connection part of the air-conditioning port 66 and the air-conditioning joint 68 have a configuration similar to that of the connection part of the warming-up port 56 and the warming-up joint 62, description thereof will not be repeated.

Figure 5:
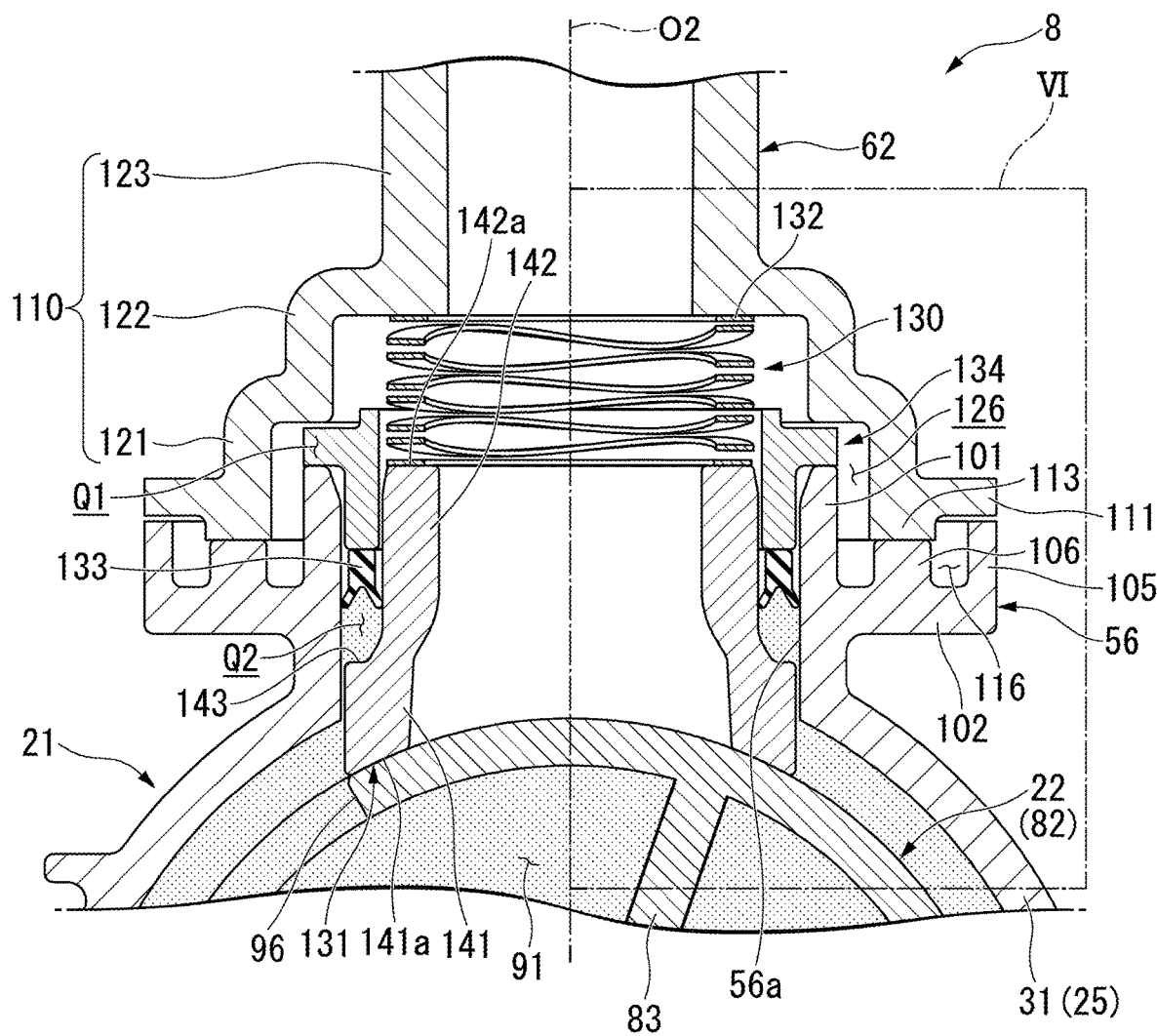
FIG. 5 is an enlarged view taken along line V-V in FIG. 2.

FIG. 5 is an enlarged cross-sectional view corresponding to line V-V in FIG. 2. In the description below, a direction along an axial line O2 of the warming-up outflow opening 56a will sometimes be referred to as a port axial direction (first direction). In this case, in the port axial direction, a direction toward the warming-up port 56 in the axial line O1 will be referred to as an inner side, and a direction separated from the warming-up port 56 in the axial line O1 will be referred to as an outer side. In addition, a direction orthogonal to the axial line O2 will be referred to as a port radial direction (second direction), and a direction around the axial line O2 will sometimes be referred to as a port circumferential direction.

As illustrated in FIG. 5, the warming-up port 56 has a sealing tube portion (sealing wall, that is, a first regulation portion) 101 extending in the port axial direction, and a port flange portion 102 bulging outward from the sealing tube portion 101 in the port radial direction.

The inner side of the sealing tube portion 101 constitutes the above-described warming-up outflow opening 56a. In the present embodiment, the inner diameter of the sealing tube portion 101 is uniquely set in regions excluding the outer end portion in the port axial direction.

An enclosing wall 105 protruding outward in the port axial direction is formed in an outer circumferential part of the port flange portion 102. The enclosing wall 105 is formed throughout the entire circumference of the port flange portion 102.

In the port flange portion 102, a port joining portion 106 protruding outward in the port axial direction is formed in a position on the inner side of the enclosing wall 105 in the port radial direction. The port joining portion 106 is formed throughout the entire circumference of the port flange portion 102.

In the example of FIG. 5, the height (dimensions in the port axial direction) of the port joining portion 106 is smaller than those of the sealing tube portion 101 and the enclosing wall 105. The width (dimensions in the port radial direction) of the port joining portion 106 is wider than those of the sealing tube portion 101 and the enclosing wall 105.

The warming-up joint 62 has a joint tube portion 110 disposed coaxially with the axial line O2, and a joint flange portion 111 bulging outward in the port radial direction from the inner end portion of the joint tube portion 110 in the port axial direction.

The joint flange portion 111 is formed to have an outer diameter similar to that of the port flange portion 102 and an inner diameter greater than the outer diameter of the sealing tube portion 101. A joint joining portion 113 protruding inward in the port axial direction is formed in an inner circumferential part of the joint flange portion 111. The joint joining portion 113 faces the port joining portion 106 in the port axial direction.

The warming-up port 56 and the warming-up joint 62 are joined to each other by performing vibration welding with respect to the facing surfaces of the port joining portion 106 and the joint joining portion 113.

In a state in which the warming-up port 56 and the warming-up joint 62 are joined to each other, the above-described enclosing wall 105 is close to or comes into contact with the outer circumferential part of the joint flange portion 111 in the port axial direction. Each of the joining portions 106 and 113, each of the flange portions 102 and 111, and the first burr accommodation portion 116 defined by the enclosing wall 105 are formed in regions on the outer side of the joining portions 106 and 113 in the port radial direction. The first burr accommodation portion 116 accommodates burrs generated at the time of joining of the warming-up port 56 and the warming-up joint 62. In this case, the enclosing wall 105 regulates burrs which are generated at the time of joining and scatters on the outer side in the port radial direction (outside the casing 21).

The joint tube portion 110 extends outward in the port axial direction from the inner circumferential edge of the joint flange portion 111. The joint tube portion 110 is formed to have a multi-stepped tubular shape which is gradually reduced in diameter outward in the port axial direction. Specifically, in the joint tube portion 110, a large diameter portion 121, an intermediate diameter portion 122, and a small diameter portion 123 are arranged in order outward in the port axial direction.

The large diameter portion 121 encloses the sealing tube portion 101 in a state having a clearance on the outer side in the port radial direction with respect to the above-described sealing tube portion 101. Each of the joining portions 106 and 113, the sealing tube portion 101, the port flange portion 102, and a second burr accommodation portion 126 defined by the joint tube portion 110 are formed in regions on the inner side of the joining portions 106 and 113 in the port radial direction. The second burr accommodation portion 126 accommodates burrs generated at the time of joining of the warming-up port 56 and the warming-up joint 62. In this case, the sealing tube portion 101 regulates burrs scattering on the inner side in the port radial direction (inside the casing 21).

The intermediate diameter portion 122 faces the sealing tube portion 101 with a gap Q1 in the port axial direction.

In the present embodiment, a sealing mechanism 130 is provided in an area surrounded by the warming-up port 56 and the warming-up joint 62. The sealing mechanism 130 includes the slide ring 131, a biasing member 132, a sealing ring 133, and a holder 134. As illustrated in FIG. 3, inside the above-described radiator port 41 and inside the air-conditioning port 66, the sealing mechanism 130 having a configuration similar to that of the sealing mechanism 130 provided inside the warming-up port 56 is provided.

In the present embodiment, the same reference sign is applied to the sealing mechanisms 130 provided inside the radiator port 41 and the air-conditioning port 66, as the sealing mechanism 130 provided inside the warming-up port 56, and description thereof will be omitted.

As illustrated in FIG. 5, the slide ring 131 is inserted into the warming-up outflow opening 56a. The slide ring 131 extends coaxially with the axial line O2 and has a multi-stepped tubular shape which is gradually reduced in outer diameter outward in the port axial direction. Specifically, the slide ring 131 has a large diameter portion 141 positioned on the inner side of the port axial direction, and a small diameter portion 142 leads to the outer side of the large diameter portion 141 in the port axial direction.

The outer circumferential surface of the large diameter portion 141 is slidably configured on the inner circumferential surface of the sealing tube portion 101. That is, movement of the large diameter portion 141 to the warming-up port 56 in the port radial direction is regulated by the sealing tube portion 101. The inner side end surface of the large diameter portion 141 in the port axial direction constitutes a slide surface 141a for sliding on the outer circumferential surface of the valve tube portion 82. In the present embodiment, the slide surface 141a is a curved surface formed along the radius of curvature of the valve tube portion 82.

The outer circumferential surface of the small diameter portion 142 leads to the outer circumferential surface of the large diameter portion 141 via a stepped surface (facing surface) 143. The stepped surface 143 is inclined outward in the port radial direction toward the inner side in the port radial direction, and then extends further outward in the port axial direction. Therefore, a sealing gap Q2 is provided between the outer circumferential surface of the small diameter portion 142 and the inner circumferential surface of the sealing tube portion 101 in the port radial direction.

On the other hand, the inner circumferential surface of the small diameter portion 142 smoothly leads to the inner circumferential surface of the large diameter portion 141. The outer side end surface of the small diameter portion 142 in the port axial direction (will hereinafter be referred to as a "bearing surface 142a") is formed to be a flat surface orthogonal to the port axial direction. The bearing surface 142a of the small diameter portion 142 is disposed at the same position as the outer side end surface of the sealing tube portion 101 in the port axial direction. The slide ring 131 is separated from the warming-up joint 62 in the port radial direction and the port axial direction.

The biasing member 132 is interposed between the bearing surface 142a of the slide ring 131 and the inner side end surface of the small diameter portion 123 in the port axial direction of the warming-up joint 62. For example, the biasing member 132 is a wave spring. The biasing member 132 biases the slide ring 131 inward in the port axial direction (toward the valve tube portion 82).

For example, the sealing ring 133 is a Y-packing. The sealing ring 133 is externally fitted over the small diameter portion 142 of the slide ring 131 in a state in which the opening portion (bifurcated portion) faces the inner side in the port axial direction. Specifically, in a state in which the sealing ring 133 is disposed inside the above-described sealing gap Q2, tip portions of bifurcated portion slidably comes into tight contact with each of the outer circumferential surface of the small diameter portion 142 and the inner circumferential surface of the sealing tube portion 101. In the inner region of the sealing ring 133 in the port axial direction inside the sealing gap Q2, a fluid pressure of the casing 21 is introduced between the inner circumferential surface of the sealing tube portion 101 and the slide ring 131. In this case, the stepped surface 143 constitutes a pressure receiving surface which faces the slide surface 141a in the port axial direction on the slide ring 131, receives a fluid pressure of cooling water inside the casing 21, and is pressed inward in the port axial direction.

Figure 6:
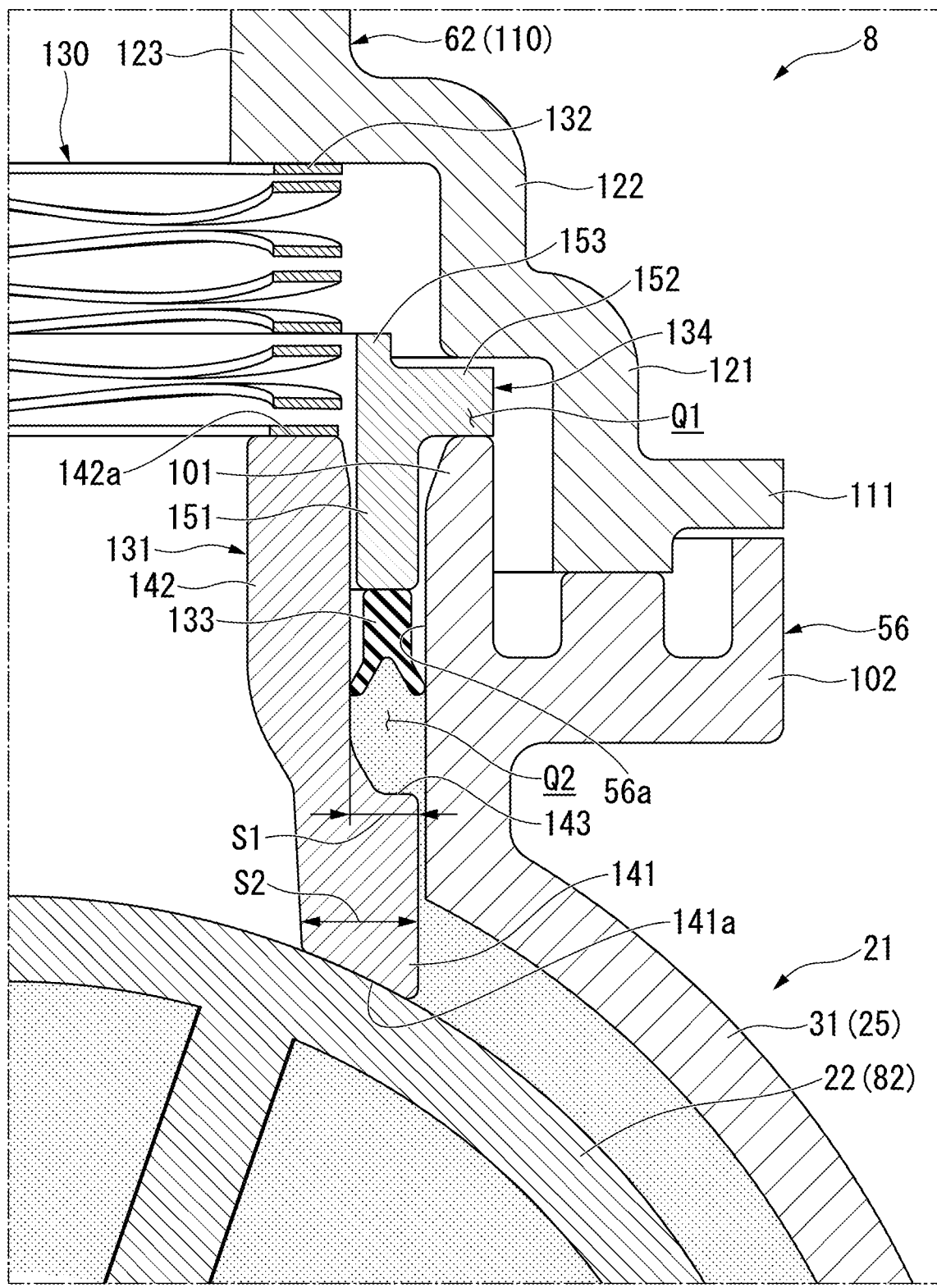
FIG. 6 is an enlarged view of the VI-section in FIG. 5.

FIG. 6 is an enlarged view of the VI-section in FIG. 5.

Here, in the slide ring 131, an area S1 of the stepped surface 143 and an area S2 of the slide surface 141a are set to satisfy the following Expressions (1) and (2).

$$S1 < S2 \leq S1/k \quad (1)$$

$$\alpha \leq k < 1 \quad (2)$$

k: Pressure reduction constant of cooling water flowing a very small gap the between slide surface 141a and the valve tube portion 82

α: Lower limit value for the pressure reduction constant determined based on physical properties of the cooling water The area S1 of the stepped surface 143 and the area S2 of the slide surface 141a denote areas when being projected in the port axial direction.

The factor α in Expression (2) is a standard value for the pressure reduction constant determined based on the type of the cooling water, the usage environment (for example, the temperature), and the like. For example, in a case of water under ordinary usage conditions, the value becomes α=½. When the physical properties of using cooling water have changed, the value changes to α=⅓, or the like.

In addition, when the slide surface 141a is uniformly in contact with the valve tube portion 82 from the outer end edge to the inner end edge in the port radial direction, the pressure reduction constant k in Expression (2) becomes α (for example, ½) which is a standard value of the pressure reduction constant. However, due to a manufacturing error or an assembling error of the slide ring 131, sometimes the gap between the outer circumferential part of the slide surface 141a and the valve tube portion 82 slightly increases with respect to the inner circumferential part of the slide surface 141a. In this case, the pressure reduction constant k in Expression (2) gradually approximates to k=1.

In the present embodiment, on the premise that there is a very small gap between the slide surface 141a of the slide ring 131 and the outer circumferential surface of the valve tube portion 82 to be slidable, the relationship between the areas S1 and S2 of the stepped surface 143 and the slide surface 141a is determined by Expressions (1) and (2).

That is, as described above, a pressure of the cooling water inside the casing 21 directly acts on the stepped surface 143 of the slide ring 131. On the other hand, the pressure of the cooling water inside the casing 21 does not directly act on the slide surface 141a. Specifically, the pressure of the cooling water acts while the pressure is reduced when the cooling water flows from the outer end edge toward the inner end edge in the port radial direction in a very small gap between the slide surface 141a and the valve tube portion 82. In this case, the pressure of the cooling water is gradually reduced toward the inner side in the port radial direction and tends to push the slide ring 131 outward in the port axial direction.

As a result, a force obtained by multiplying the area S1 of the stepped surface 143 by a pressure P inside the casing 21 directly acts on the stepped surface 143 of the slide ring 131. On the other hand, a force obtained by multiplying the area S2 of the slide surface 141a by the pressure P inside the casing 21 and the pressure reduction constant k acts on the slide surface 141a of the slide ring 131.

In the control valve 8 of the present embodiment, as clear from Expression (1), the areas S1 and S2 are set such that k×S2≤S1 is established. Accordingly, the relationship P×k×S2≤P×S1 is also established.

Therefore, a force F1 (F1=P×S1) in a pressing direction acting on the stepped surface 143 of the slide ring 131 increases to be equal to or greater than a force F2 (F2=P×k×S2) in a rising direction acting on the slide surface 141a of the slide ring 131. Thus, in the control valve 8 of the present embodiment, an area between the slide ring 131 and the valve tube portion 82 can be sealed even by only the relationship related to the pressure of the cooling water inside casing 21.

On the other hand, in the present embodiment, as described above, the area S1 of the stepped surface 143 of the slide ring 131 is smaller than the area S2 of the slide surface 141a. Therefore, even if the pressure of the cooling water inside casing 21 increases, the slide surface 141a of the slide ring 131 can be prevented from being pressed to the valve tube portion 82 by an excessive force. Therefore, when the control valve 8 of the present embodiment is employed, the drive unit 23 which rotationally drives the rotor 22 can avoid being increased in size and having a high output, and early abrasion of the slide ring 131 and each of the bushings 78 and 84 (refer to FIG. 4).

In this manner, in the present embodiment, within a range in which a pressing force to the inner side in the port axial direction acting on the slide ring 131 does not fall below a rising force to the outer side in the port axial direction acting on the slide ring 131, the area S2 of the slide surface 141a is set to be greater than the area S1 of the stepped surface 143. Therefore, the valve tube portion 82 can be prevented from being pressed by the slide ring 131 with an excessive force, and an area between the slide ring 131 and the valve tube portion 82 can be sealed.

The above-described holder 134 is configured to be movable in the port axial direction with respect to the warming-up port 56 and the warming-up joint 62 inside the sealing gap Q2. In addition, the holder 134 is disposed to be separated in the port axial direction with respect to at least any of the warming-up port 56 and the warming-up joint 62. Specifically, the holder 134 has a holder tube portion 151, a holder flange portion 152, and a regulation portion 153.

The holder tube portion 151 extends in the port axial direction. The holder tube portion 151 is inserted into the above-described sealing gap Q2 from the outer side in the port axial direction. The inner side end surface of the holder tube portion 151 in the port axial direction is configured such that the bottom portion of the above-described sealing ring 133 can come into contact with. That is, the holder tube portion 151 regulates movement of the sealing ring 133 outward in the port axial direction.

The holder 134 of the present embodiment encloses the small diameter portion 142 in a state in which the holder tube portion 151 is wrapped by the small diameter portion 142 in the port axial direction. In this case, the holder 134 partitions the warming-up port 56, and the warming-up joint 62 and the slide ring 131 from each other while being separated from the warming-up joint 62 and the slide ring 131, and regulates movement of the slide ring 131 in the port radial direction. The holder tube portion 151 need only be configured to be able to come into contact with the sealing ring 133 in the port axial direction. The holder tube portion 151 may be configured to be press-fitted into the sealing tube portion 101 or may be configured to slide with respect to the sealing tube portion 101 or the slide ring 131.

The holder flange portion 152 protrudes outward in the port radial direction from the outer end portion in the port axial direction in the holder tube portion 151. The holder flange portion 152 is disposed in the gap Q1 between the outer side end surface of the sealing tube portion 101 in the port axial direction and the inner side end surface of the intermediate diameter portion 122 in the port axial direction. The thickness of the holder flange portion 152 in the port axial direction is smaller than the gap Q1. Therefore, the holder 134 is configured to be movable in the port axial direction as much as the difference between the gap Q1 and the thickness of the holder flange portion 152 in the port axial direction.

In this case, movement of the holder 134 to the inner side in the port axial direction is regulated by the sealing tube portion 101. On the other hand, movement of the holder 134 to the outer side in the port axial direction is regulated by the intermediate diameter portion 122. Therefore, the sealing ring 133 is held at a desired position (between the outer circumferential surface of the small diameter portion 142 and the inner circumferential surface of the sealing tube portion 101).

At the time of joining the warming-up port 56 and the warming-up joint 62 (in a state in which no fluid pressure is acting on the sealing ring 133) and the like, when the control valve 8 is mounted while the inner side in the port axial direction is directed downward in the gravity direction, the holder flange portion 152 is supported by the sealing tube portion 101 in the port axial direction. In addition, the holder flange portion 152 is held while being separated from the warming-up joint 62.

At the time of joining the warming-up port 56 and the warming-up joint 62 to each other as described above, the holder 134 need only be separated from at least the warming-up joint 62. The expression "separated" means that the holder 134 (holder flange portion 152) and the warming-up joint 62 (intermediate diameter portion 122) have a gap of 50 µm or greater therebetween in the port axial direction. However, when a fluid pressure acts on the sealing ring 133, in a case where the holder 134 moves outward in the port axial direction with respect to the warming-up joint 62, the holder flange portion 152 may come into contact with the intermediate diameter portion 122 in the port axial direction.

The regulation portion 153 is formed to have a cylindrical shape protruding outward in the port axial direction from the inner circumferential part of the holder tube portion 151. The regulation portion 153 regulates movement of the biasing member 132 in the port radial direction together with the holder tube portion 151. The regulation portion 153 further protrudes outward in the port axial direction than the inner side end surface of the above-described intermediate diameter portion 122 in the port axial direction. The regulation portion 153 is separated in the port radial direction with respect to the intermediate diameter portion 122 of the joint tube portion 110 and is separated in the port axial direction with respect to the small diameter portion 123. The regulation portion 153 is not limited to having a tubular shape and may be intermittently formed in the port circumferential direction.

For example, the warming-up port 56 and the warming-up joint 62 described above are assembled by the following method.

First, the slide ring 131 is inserted into the warming-up outflow opening 56a. Thereafter, the sealing ring 133, the holder 134, the biasing member 132 are set in order. In this case, it is preferable that the holder 134 and the sealing ring 133 are pushed until the holder flange portion 152 of the holder 134 comes into contact with the sealing tube portion 101 in the port axial direction.

Subsequently, the warming-up joint 62 is set to the warming-up port 56 such that the joint joining portion 113 of the warming-up joint 62 and the port joining portion 106 of the warming-up port 56 comes into contact with each other. Then, both the joining portions 106 and 113 are subjected to vibration welding. In this case, in a state in which the holder 134 and the warming-up joint 62 are separated from each other, both the joining portions 106 and 113 are subjected to vibration welding. The connection part of the radiator port 41 and the radiator joint 42 and the connection part of the air-conditioning port 66 and the air-conditioning joint 68 can also be assembled by a method similar to the method described above.

[Method of Operating Control Valve]

Next, a method of operating the above-described control valve 8 will be described.

As illustrated in FIG. 1, in the main flow channel 10, cooling water sent out from the water pump 3 is subjected to a heat exchange in the engine 2. Thereafter, the cooling water flows toward the control valve 8. As illustrated in FIG. 4, the cooling water which has passed through the engine 2 in the main flow channel 10 flows into the connection flow channel 92 inside the casing 21 through the inflow opening 37a.

In the cooling water which has flowed into the connection flow channel 92, a portion of the cooling water flows into the EGR outflow opening 51. The cooling water which has flowed into the EGR outflow opening 51 is supplied to the inside of the EGR flow channel 14 through the EGR joint 52. The cooling water supplied to the inside of the EGR flow channel 14 is subjected to a heat exchange between the cooling water and the EGR gas in the EGR cooler 7. Thereafter, the cooling water returns to the main flow channel 10.

On the other hand, in the cooling water which has flowed into the connection flow channel 92, the cooling water which has not flowed into the EGR outflow opening 51 flows into the flow passage 91 from the second side in the case axial direction. The cooling water which has flowed into the flow passage 91 is distributed to each of the outflow openings during a process of flowing through the inside of the flow passage 91 in the case axial direction. That is, the cooling water flowing into the flow passage 91 is distributed to each of the flow channels 11 to 13 through the outflow opening which communicates with the communication opening among the outflow openings.

In the control valve 8, in order to switch the communication pattern between the outflow opening and the communication opening, the rotor 22 is rotated around the axial line O1. Then, rotation of the rotor 22 is stopped at a position corresponding to the communication pattern intended to be set, so that the outflow opening and the communication opening communicate with each other in the communication pattern corresponding to the stop position of the rotor 22.

In this manner, the holder 134 is interposed between the inner circumferential surface of the warming-up port 56 and the outer circumferential surface of the slide ring 131, and the holder 134 is disposed to be separated the port axial direction with respect to at least any of the warming-up port 56 and the warming-up joint 62.

According to the configuration, vibration transmitted to the warming-up joint 62 at the time of vibration welding of the warming-up joint 62 and the warming-up port 56 can be prevented from being transmitted to the slide ring 131. Therefore, movement of the slide ring 131 in the port radial direction can be regulated by the holder 134, and the slide ring 131 can be assembled at a desired position. As a result, sealing properties between the warming-up joint 62 and the rotor 22 can be ensured, and desired flow rate characteristics can be achieved.

Particularly, in the present embodiment, the holder 134, which is disposed to be separated from at least any of the warming-up port 56 and the warming-up joint 62, holds the sealing ring 133 from the outer side in the port axial direction.

According to the configuration, vibration transmitted to the warming-up joint 62 at the time of vibration welding of the warming-up joint 62 and the warming-up port 56 can be prevented from being transmitted to the sealing ring 133 via the holder 134. Therefore, movement of the sealing ring 133 to the outer side in the port axial direction can be regulated by the holder 134, and the sealing ring 133 can be assembled at a desired position. As a result, sealing properties between the warming-up joint 62 and the rotor 22 can be ensured, and desired flow rate characteristics can be achieved.

In the present embodiment, the holder 134 is configured to be movable in the port axial direction with respect to the warming-up port 56 and the warming-up joint 62 inside the sealing gap Q2.

According to the configuration, compared to a configuration in which the holder 134 is fixed to the sealing tube portion 101 through press-fitting or the like, dimensional management becomes easier and assembling properties of the holder 134 can be improved.

In the present embodiment, the warming-up port 56 is configured to have the sealing tube portion 101 which comes into contact with the holder flange portion 152 from the inner side in the port axial direction.

According to the configuration, it is possible to regulate movement of the holder 134 inward in the port axial direction with respect to the casing 21. Accordingly, inside the sealing gap Q2, the holder 134 is easily assembled to a desired position. Therefore, the sealing ring 133 can be prevented from being squashed at the time of assembling the holder 134.

In the present embodiment, when at least the warming-up port 56 and the warming-up joint 62 are joined, the holder 134 and the warming-up joint 62 need only be separated from each other. That is, when a fluid pressure inside the casing 21 acts on the sealing ring 133 and the sealing ring 133 moves outward in the port axial direction together with the holder 134, the holder 134 and the warming-up joint 62 may come into contact with each other.

In the present embodiment, the holder 134 has the regulation portion 153 which regulates movement of the biasing member 132 in the port radial direction.

According to the configuration, the biasing member 132 can be prevented from being misaligned, and an area between the slide ring 131 and the valve tube portion 82 can be stably sealed over a long period of time.

Particularly, since the regulation portion 153 further protrudes outward in the port axial direction than the gap Q1, the biasing member 132 can be prevented from being misaligned. Therefore, the port flange portion 102 and the intermediate diameter portion 122 can be reliably separated in the port axial direction.

In the present embodiment, the second burr accommodation portion 126 is configured to be defined between each of the joining portions 106 and 113 and the sealing tube portion 101.

According to the configuration, scattering of burrs, which is generated when the warming-up port 56 and the warming-up joint 62 are joined to each other, is regulated in the port radial direction (inside the casing 21). Accordingly, burrs can be prevented from being incorporated into the cooling water and becoming contamination.

Furthermore, in the present embodiment, since scattering of burrs can be regulated by the sealing tube portion 101, it is possible to be reduced in size and simplified compared to a case in which a burr regulation wall is provided separately from the sealing tube portion 101.

Modification Example

Figure 7:
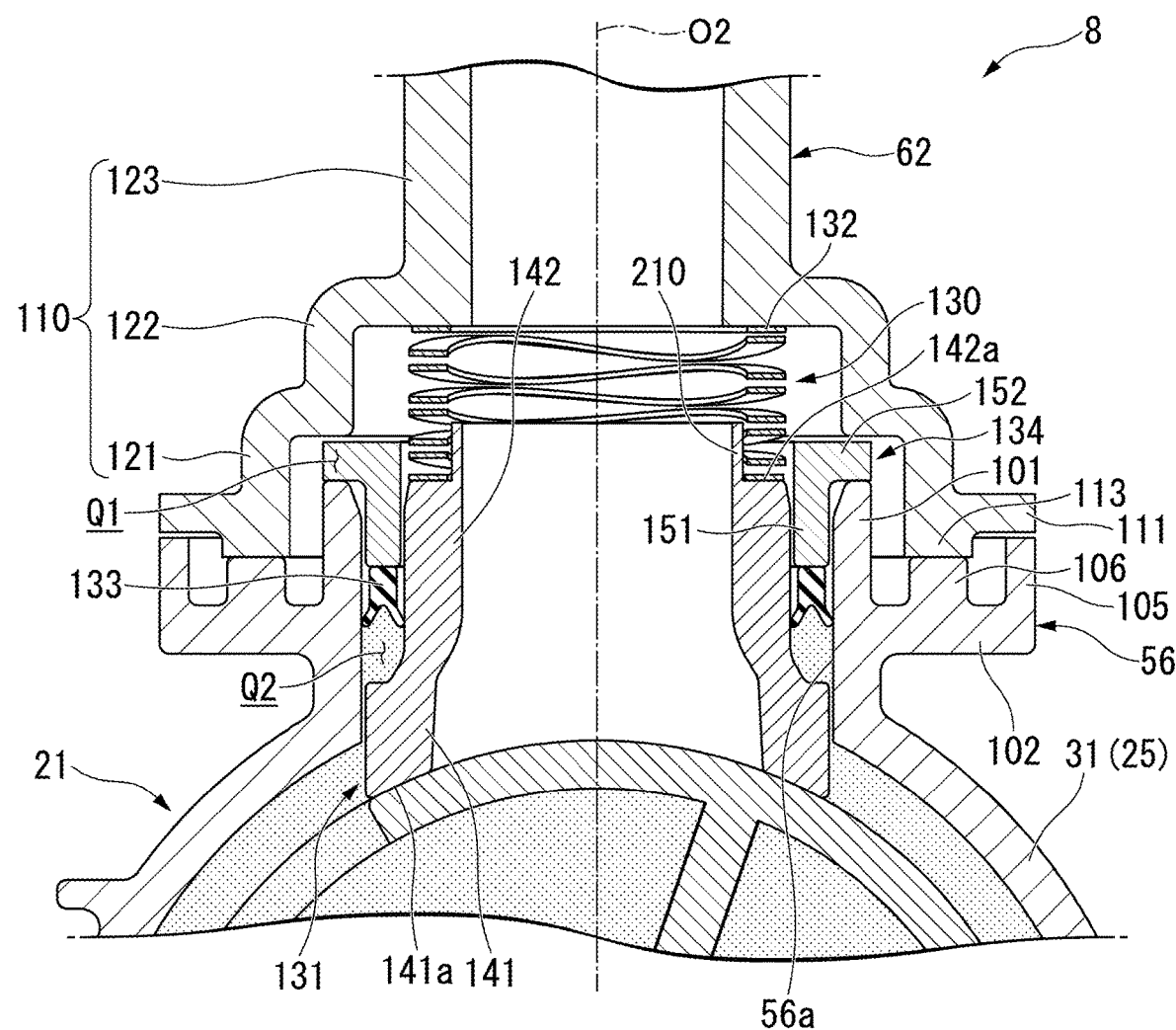
FIG. 7 is a cross-sectional view corresponding to FIG. 5 according to a first modification example.
Figure 8:
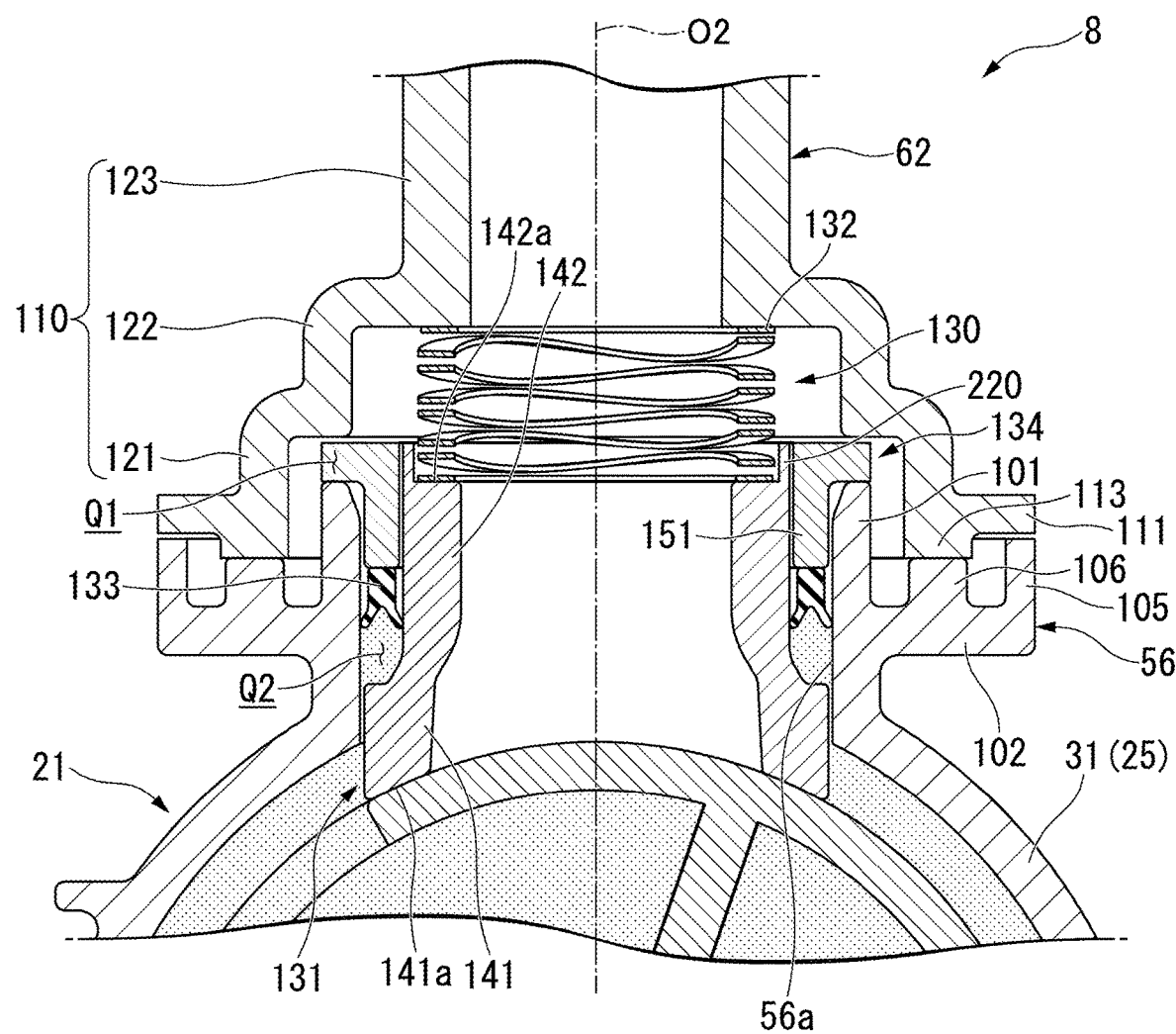
FIG. 8 is a cross-sectional view corresponding to FIG. 5 according to a second modification example.
Figure 9:
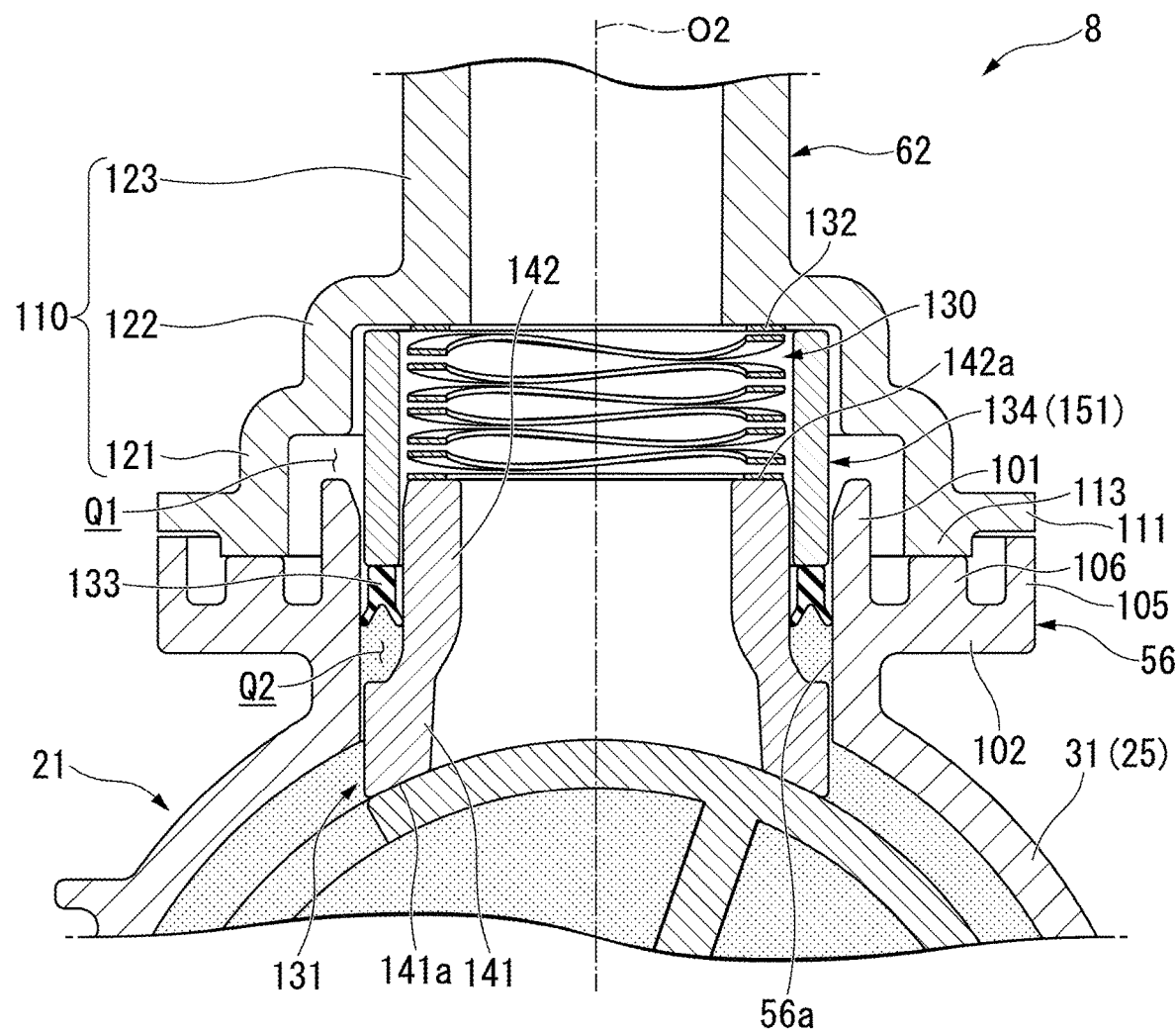
FIG. 9 is a cross-sectional view corresponding to FIG. 5 according to a third modification example.

Subsequently, modification examples of the above-described embodiment will be described. FIGS. 7 to 9 are cross-sectional views according to the modification examples of the embodiment, corresponding to FIG. 5 of the embodiment. In the description below, the same reference signs are applied to configurations similar to those of the embodiment described above, and description will be suitably omitted.

First Modification Example

The control valve 8 illustrated in FIG. 7 differs from the above-described embodiment in that the regulation portion 210 is formed in the slide ring 131 instead of the above-described regulation portion 153. Specifically, in the slide ring 131, the regulation portion 210 is formed to have a tubular shape protruding outward in the port axial direction from the inner circumferential part of the small diameter portion 142 (bearing surface 142a). The regulation portion 210 enters the inner side of the biasing member 132 in the port radial direction. Accordingly, the regulation portion 210 regulates movement of the biasing member 132 in the port radial direction with respect to the slide ring 131. The inner circumferential surface of the regulation portion 210 smoothly leads to the inner circumferential surface of the small diameter portion 142.

In the present modification example as well, the biasing member 132 can be prevented from being misaligned in the port radial direction, and an area between the slide ring 131 and the valve tube portion 82 can be stably sealed over a long period of time.

Furthermore, in the present modification example, the inner circumferential surface of the regulation portion 210 smoothly leads to the inner circumferential surface of the small diameter portion 142. Therefore, a turbulent flow can be prevented from occurring in cooling water passing through the sealing mechanism 130, so that the cooling water can smoothly flow through.

Second Modification Example

As in the control valve 8 illustrated in FIG. 8, in the slide ring 131, a regulation portion 220 may be formed in the outer circumferential part of the small diameter portion 142. In this case, the regulation portion 220 regulates movement of the biasing member 132 in the port radial direction with respect to the slide ring 131 by surrounding the biasing member 132 from the outer side in the port radial direction.

Third Modification Example

In regard to the point that the holder 134 has only the holder tube portion 151 (does not have the holder flange portion 152 or the regulation portion 153), the control valve 8 illustrated in FIG. 9 differs from the above-described embodiment. The holder tube portion 151 is configured to be movable in the port axial direction with respect to the warming-up port 56 and the warming-up joint 62. In addition, the holder 134 is held to be separated in the port axial direction with respect to both the warming-up port 56 and the warming-up joint 62. The holder tube portion 151 surrounds the small diameter portion 142 of the slide ring 131 and the periphery of the biasing member 132. In this case, the holder tube portion 151 is separated in the port radial direction with respect to the inner circumferential surface of the intermediate diameter portion 122 and is separated in the port axial direction with respect to the inner circumferential surface of the small diameter portion 123 in the port axial direction.

In the present modification example, the holder 134 can be simplified, compared to a case in which the holder flange portion 152 or the regulation portion 153 is formed.

In addition, since the holder 134 can be assembled regardless of the way to be directed in the port axial direction of the holder 134, assembling properties can be further improved.

Moreover, compared to a configuration including the holder flange portion 152, the port radial direction can be reduced in scale.

The technical range of the present invention is not limited to the embodiment described above, and various changes can be applied to the above-described embodiment without departing from the gist of the present invention.

For example, in the embodiment described above, a configuration in which the control valve 8 is mounted in the cooling system 1 of the engine 2 has been described. However, the configuration is not limited to only this configuration, and the control valve 8 may be mounted in other systems.

In the embodiment described above, a configuration in which cooling water that has flowed into the control valve 8 is distributed to the radiator flow channel 11, the warming-up flow channel 12, the air-conditioning flow channel 13, and the EGR flow channel 14 has been described. However, the configuration is not limited to only this configuration, and the control valve 8 need only be configured to distribute the cooling water that has flowed into the control valve 8 to at least two flow channels.

In addition, the layout, the type, the shape, and the like of each of the communication openings and the outflow openings can also be suitably changed.

In the embodiment described above, for example, a configuration in which the inflow openings, each of the communication openings, and each of the outflow openings penetrate the valve tube portion 82 and the casing 21 in the case radial direction has been described. However, the configuration is not limited to only this configuration. For example, each of the communication openings and each of the outflow openings may penetrate the valve tube portion 82 and the casing 21 in the case axial direction.

In the embodiment described above, a case in which the outflow port and the joint are joined to each other through vibration welding has been described. However, the configuration is not limited to only this configuration. Various welding methods or bonding may be employed. When the members are joined to each other using a method other than vibration welding (ultrasound welded or the like), the slide ring and the sealing ring can be prevented from being misaligned due to joining, by employing the above-described embodiment. For example, when the outflow port and the joint are bonded, a surplus bonding agent can be prevented reaching the slide ring through the joint.

In the embodiment described above, a configuration in which the sealing tube portion 101 also serves as the sealing wall and the first regulation portion has been described. However, the configuration is not limited to only this configuration. That is, the sealing wall and the first regulation portion may be separately configured.

In the embodiment described above, a configuration in which the holder 134 is disposed to be separated in the port axial direction with respect to the warming-up joint 62, and a configuration in which the holder 134 is disposed to be separated in the port axial direction with respect to both the warming-up port 56 and the warming-up joint 62 have been described. However, the configuration is not limited to only these configurations. That is, the holder 134 need only be disposed to be separated from at least any of the warming-up port 56 and the warming-up joint 62. In this case, the holder 134 may be disposed (may come into contact with the warming-up joint 62) in only the warming-up port 56 to be separated. In addition, the holder 134 and at least any of the warming-up port 56 and the warming-up joint 62 may be disposed to be separated in the port radial direction.

In the embodiment described above, the configuration in which the rotor 22 (the valve tube portion 82) and the casing 21 (the circumferential wall portion 31) are formed into the cylindrical shape (of which the diameter is uniform over the axial direction) has been described. However, the embodiment is not limited to only this configuration. That is, the outside diameter of the valve tube portion 82 and the inside diameter of the circumferential wall portion 31 may be changed in the axial direction as long as the valve tube portion 82 is configured to rotate inside the circumferential wall portion 31.

In this case, various types of shapes may be employed for the valve tube portion 82 and the circumferential wall portion 31, for example, a spherical shape (a shape of which diameter is gradually reduced from a center portion to both end portions in the axial direction), a shape where the spherical shapes lie in the axial direction, a tapered shape (a shape of which diameter is gradually changed from a first side to a second side in the axial direction), a stepped shape (a shape of which diameter is changed in stepwise from the first side to the second side in the axial direction). In the embodiment described above, the configuration in which both ends of the valve tube portion 82 of the rotor 22 in the axial direction are opened has been described. However, the embodiment is not limited to only this configuration. The design of the rotor 22 can be appropriately changed as long as the cooling water is able to enter inside the valve tube portion 82. For example, the rotor 22 may be configured to have block portions blocking both end opening portions of the valve tube portion 82 in the axial direction. In this case, the block portions may be formed with communication holes, and the like communicating the inside and the outside of the rotor 22. Alternatively, the block portion(s) may be configured to block at least one of the opening portions of the valve tube portion 82 in the axial direction.

Furthermore, the constituent elements in the above-described embodiment can be suitably replaced with known constituent elements within a range not departing from the gist of the present invention. In addition, the above-described modification examples may be suitably combined. The present invention is not limited to the description above but is limited to only the accompanying aspects of the invention.

What is claimed is:

1. A control valve comprising:
   a casing having an outflow port which is open in a first direction and in which an outflow opening for a fluid is formed;
   a joint that is joined to an opening end surface of the outflow opening in the outflow port;
   a rotor that is rotatably accommodated inside the casing and has a communication opening formed to be able to communicate with the outflow opening;
   a slide ring that has a slide surface for sliding on an outer circumferential surface of the rotor while being accommodated inside the outflow port and communicates the outflow opening and the communication opening in accordance with a rotational position of the rotor;
   a spring that is interposed between the joint and the slide ring and biasing the slide ring toward the rotor; a sealing ring that is interposed between an inner circumferential surface of the outflow port and an outer circumferential surface of the slide ring; and
   a holder that is disposed between the inner circumferential surface of the outflow port and the outer circumferential surface of the slide ring and holds the sealing ring from an opposite side of the rotor in the first direction with respect to the sealing ring,
   wherein the holder is disposed to be separated from at least any of the joint and the outflow port,
   wherein the holder includes
      a holder tube portion which surrounds the periphery of the slide ring, and
      a holder flange portion which bulges outward from the holder tube portion, and
   wherein the outflow port has a first regulation portion which comes into contact with the holder flange portion in the first direction and regulates movement of the holder to the rotor side in the first direction with respect to the casing.

2. The control valve according to claim 1,
   wherein the slide ring includes
      a small diameter portion having the outer circumferential surface on which the sealing ring slides, and
      a large diameter portion which is positioned on the rotor side in the first direction with respect to the small diameter portion and is increased in diameter with respect to the small diameter portion,
   wherein a surface of the large diameter portion facing the rotor in the first direction configures the slide surface,
   wherein a surface of the large diameter portion facing the opposite side of the rotor in the first direction configures a facing surface facing the sealing ring in the first direction, and
   wherein an area of the slide surface is greater than an area of the facing surface.

3. The control valve according to claim 1,
   wherein the holder is disposed to be movable in the first direction with respect to the casing and the joint.

4. The control valve according to claim 1,
   wherein a second regulation portion which protrudes in the first direction from the holder tube portion and regulates movement of the spring in a second direction intersecting the first direction is formed in the holder.

5. The control valve according to claim 1,
   wherein the outflow port includes
      a port joining portion which is positioned in an outer circumferential part, and
      a sealing wall which is positioned on the inner circumferential side with respect to the port joining portion and has an inner circumferential surface on which the sealing ring slides,
   wherein the joint includes a joint joining portion which is joined to the port joining portion, and
   wherein a burr accommodation portion which accommodates burrs generated when the port joining portion and the joint joining portion are joined to each other is formed between the sealing wall, and the port joining portion and the joint joining portion.

* * * * *